US009303838B2

United States Patent
Ogata et al.

(10) Patent No.: US 9,303,838 B2
(45) Date of Patent: Apr. 5, 2016

(54) VEHICLE LIGHT AND VEHICLE EQUIPPED WITH VEHICLE LIGHT

(71) Applicant: Panasonic Corporation, Osaka (JP)

(72) Inventors: Tomoyuki Ogata, Osaka (JP);
Tomoyuki Nakano, Osaka (JP);
Yasufumi Shirakawa, Osaka (JP); Hiro Aoki, Osaka (JP); Toshifumi Tanaka, Osaka (JP); Yuki Nishida, Hyogo (JP);
Kazuki Masuda, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 57 days.

(21) Appl. No.: 14/454,067

(22) Filed: Aug. 7, 2014

(65) Prior Publication Data
US 2015/0055361 A1 Feb. 26, 2015

(30) Foreign Application Priority Data

Aug. 26, 2013 (JP) .................................. 2013-174260

(51) Int. Cl.
| | |
|---|---|
| *F21V 9/00* | (2015.01) |
| *F21S 8/10* | (2006.01) |
| *B60Q 1/28* | (2006.01) |
| *B60Q 1/00* | (2006.01) |
| *B60Q 1/26* | (2006.01) |
| *B60Q 1/38* | (2006.01) |

(52) U.S. Cl.
CPC ........... *F21S 48/2237* (2013.01); *B60Q 1/0035* (2013.01); *B60Q 1/0041* (2013.01); *B60Q 1/0058* (2013.01); *B60Q 1/2607* (2013.01); *B60Q 1/28* (2013.01); *B60Q 1/38* (2013.01); *F21S 48/215* (2013.01); *F21S 48/2243* (2013.01); *F21S 48/2268* (2013.01); *F21S 48/2281* (2013.01); *F21S 48/2287* (2013.01)

(58) Field of Classification Search
CPC . F21S 48/2237; F21S 48/215; F21S 48/2287; F21S 48/2243; F21S 48/2281; F21S 48/2268; B60Q 1/0041; B60Q 1/0035; B60Q 1/38; B60Q 1/2607; B60Q 1/0058; B60Q 1/28
See application file for complete search history.

(56) References Cited

U.S. PATENT DOCUMENTS

| | | | | |
|---|---|---|---|---|
| 6,361,180 | B1 * | 3/2002 | Iimura | ............ G02F 1/133615 362/551 |
| 9,039,260 | B2 * | 5/2015 | Faffelberger | ............ B60Q 1/04 362/511 |
| 2013/0044503 | A1 | 2/2013 | Mihara et al. | |
| 2013/0128601 | A1 * | 5/2013 | Kim | ..................... B60Q 1/2607 362/511 |

FOREIGN PATENT DOCUMENTS

JP      2012-243539 A      12/2012

* cited by examiner

*Primary Examiner* — Donald Raleigh
(74) *Attorney, Agent, or Firm* — Renner, Otto, Boisselle & Sklar, LLP

(57) ABSTRACT

A vehicle light installed in a vehicle includes: a main case having a front opening; first and second light guides that are disposed in the main case; light sources that emit light into the first and second light guides; and a translucent cover fitted to cover the opening of the main case. The first light guide is rod-shaped and includes a first extended section extending from the inboard side of the first light guide relative to the vehicle width direction toward the outboard side of the first light guide relative to the same and a second extended section that continues from the first extended section, curves back inwardly, and extends to the inboard side, and the second light guide is plate-shaped and disposed so as to pass in front of or behind the portion of the first light guide that curves back.

6 Claims, 8 Drawing Sheets

VEHICLE LIGHT AND VEHICLE EQUIPPED WITH VEHICLE LIGHT

CROSS REFERENCE TO THE RELATED APPLICATION

This application claims the benefit of priority of Japanese Patent Application Number 2013-174260, filed Aug. 26, 2013, the entire content of which is hereby incorporated by reference.

TECHNICAL FIELD

The present disclosure relates to vehicle lights and vehicles equipped with vehicle lights.

BACKGROUND ART

Conventionally, relevant vehicle lights are positioned at vehicle widthwise left and right sides of the front and back of the vehicle. These vehicle lights are illuminated to indicate the presence or the size (width) of the vehicle.

In recent years, vehicle lights that use light guides to increase the area of illumination in an effort to make recognition of the presence or size (width) of the vehicle easier have appeared (for example, see Japanese Unexamined Patent Application Publication No. 2012-243539).

For example, a vehicle light using a light guide includes a main case having a front opening, a light guide disposed in the main case, a light source that emits light into the light guide, and a translucent cover fitted to cover the opening of the main case.

The light guide is, for example, a rod-shaped light guide that, when the main case is installed in the vehicle, extends outward in the widthwise direction of the vehicle, curves back in a U shape, and then continues to extend inward in the widthwise direction of the vehicle.

The light guide having this sort of shape has a predetermined length in the widthwise direction of the vehicle, giving it a visible presence.

SUMMARY

However, this sort of light guide having a rod-shaped body illuminates substantially evenly throughout the inboard, outboard, and center portions. Consequently, when the light guide is used to indicate the width of the vehicle, there are cases where the light from the inboard portion of the light guide causes confusion about the actual width of the vehicle.

For example, there are instances where the light from the inboard portion of the light guide causes the width of the vehicle to be mistakenly recognized, leading to a decrease in the recognition rate of the width of the vehicle.

An object of one aspect of the present invention is to improve the recognition rate of the width of the vehicle.

In order to achieve this object, the vehicle light according to one aspect of the present invention includes: a main case having a front opening; a first light guide and a second light guide that are disposed in the main case; a light source that emits light into the first light guide and the second light guide; and a translucent cover fitted to cover the opening of the main case, wherein the first light guide is rod-shaped and includes a first extended section extending from an inboard side of the first light guide relative to a widthwise direction of the vehicle toward an outboard side of the first light guide relative to the widthwise direction of the vehicle and a second extended section that continues from the first extended section, curves back inwardly, and extends to the inboard side, and the second light guide is plate-shaped and disposed so as to pass one of in front of and behind a portion of the first light guide that curves back.

According to one aspect of the present invention, it is possible to improve the recognition rate of the width of the vehicle.

BRIEF DESCRIPTION OF DRAWINGS

The figures depict one or more implementations in accordance with the present teaching, by way of examples only, not by way of limitations. In the figures, like reference numerals refer to the same or similar elements.

Figure 9:
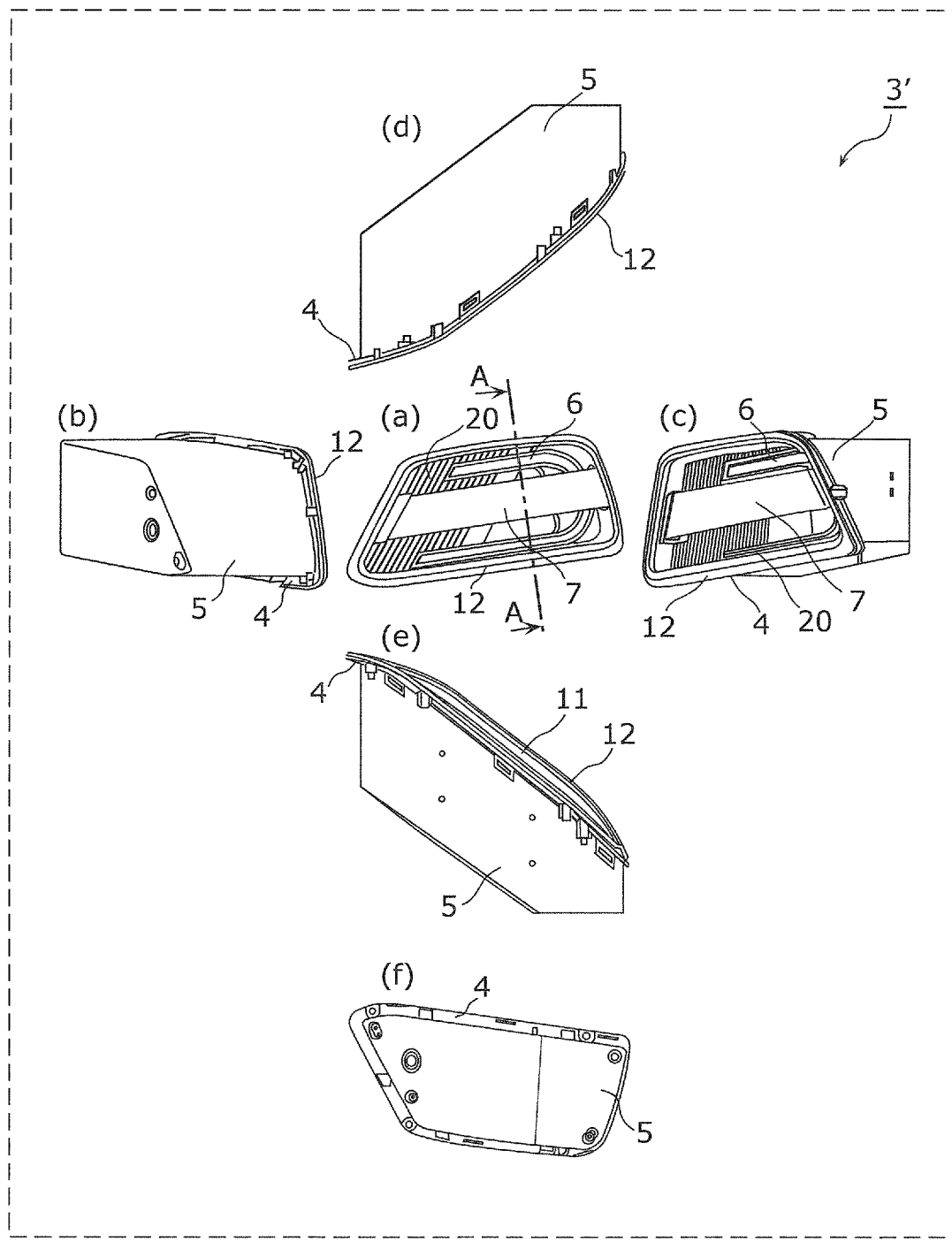

(a) in FIG. 9 is a front view of a vehicle light according to an example of the present invention, (b) in FIG. 9 is a left side view of the same vehicle light, (c) in FIG. 9 is a right side view of the same vehicle light, (d) in FIG. 9 is a top view of the same vehicle light, (e) in FIG. 9 is a bottom view of the same vehicle light, and (f) is a rear view of the same vehicle light.

Figure 10:
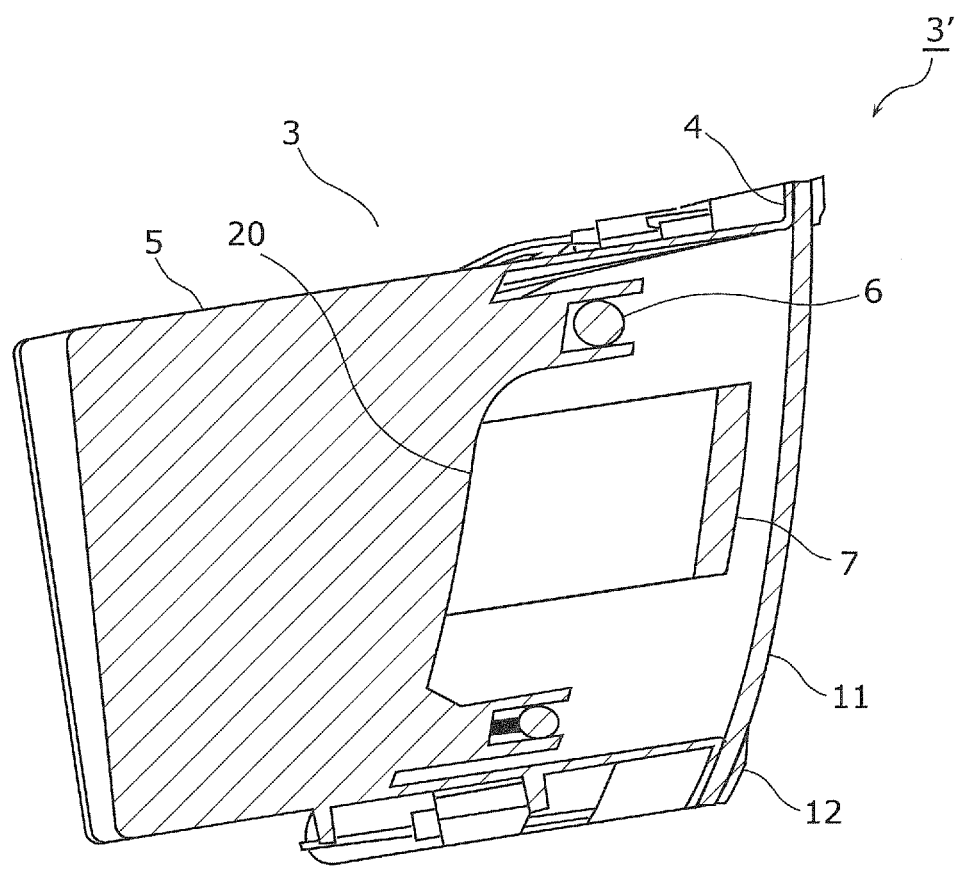

FIG. 10 is a cross sectional view of a vehicle light according to an example of the present invention at the line A-A shown in (a) in FIG. 9.

DETAILED DESCRIPTION

Hereinafter an exemplary embodiment of the present invention will be described with reference to the Drawings. The following exemplary embodiment shows a general or specific example. The numerical values, shapes, materials, structural elements, the arrangement and connection of the structural elements, steps, the processing order of the steps etc. shown in the following exemplary embodiment are mere examples, and therefore do not limit the present invention. Therefore, among the structural elements in the following exemplary embodiments, structural elements not recited in any one of the independent claims defining the most generic part of the inventive concept are described as arbitrary structural elements.

Moreover, the Drawings are schematic drawings, and are not necessarily exact depictions. Moreover, in the Drawings, elements having the same essential configuration share the same reference numerals, and multiple descriptions thereof are omitted or abridged.

Embodiment

First, a vehicle 1 according to an embodiment of the present invention will be described with reference to FIG. 1.

Figure 1:
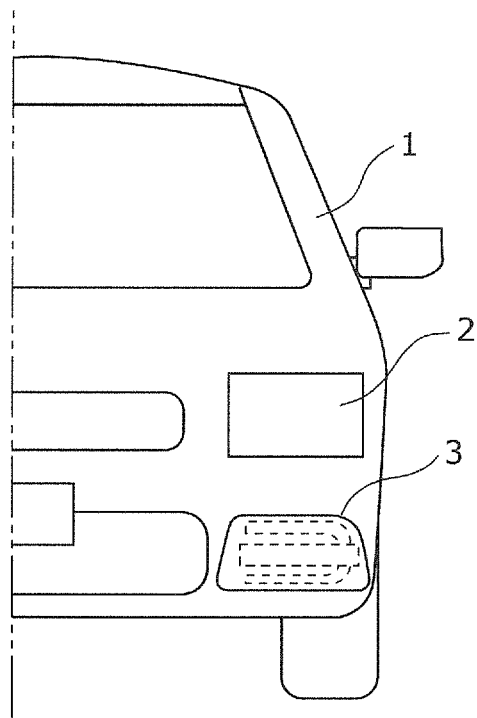
FIG. 1 is a front view of the left half of a vehicle equipped with a vehicle light according to an example of the present invention.

FIG. 1 is a front view of the left half of a vehicle equipped with a vehicle light according to an embodiment of the present invention.

As is illustrated in FIG. 1, the vehicle 1 is one example of an automobile, and is, for example, a four-wheeled vehicle such as gasoline powered vehicle or an electric vehicle. Headlamps 2 are provided on the left and right sides of the front of the vehicle 1. Moreover, vehicle lights 3 for indicating the width of the vehicle are arranged below the headlamps 2.

It should be noted that only the left half of the vehicle 1 is shown in FIG. 1, but the headlamp 2 and the vehicle light 3 are also provided on the right half as well. In other words, the headlamp 2 and the vehicle light 3 are disposed to a left and right of a longitudinal center line of the vehicle.

Figure 2:
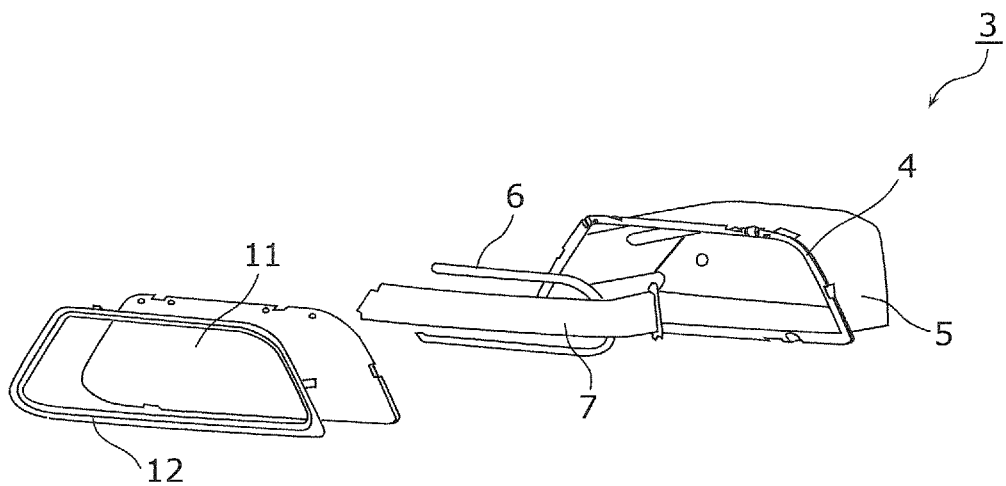
FIG. 2 is an exploded perspective view of a vehicle light according to an example of the present invention.
Figure 3:
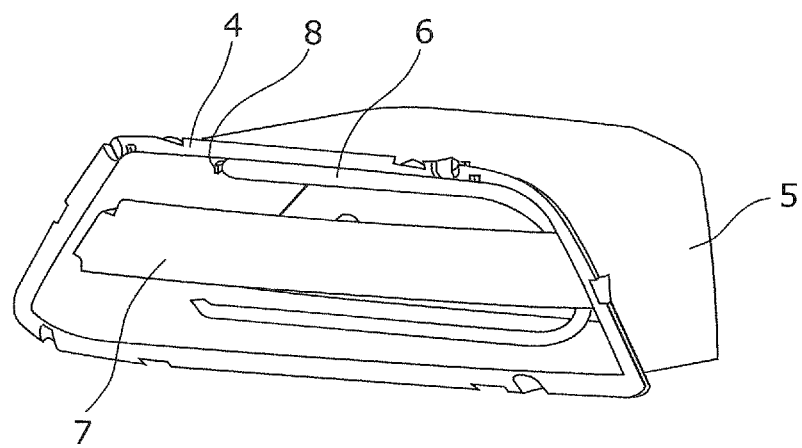
FIG. 3 is a perspective view of relevant components of a vehicle light according to an example of the present invention.
Figure 4:
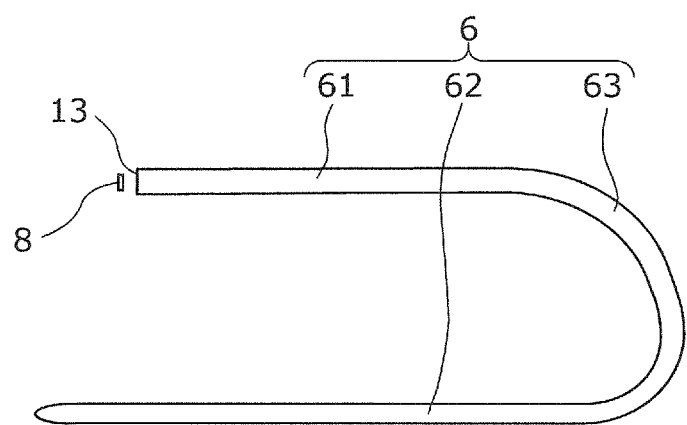
FIG. 4 is a perspective view of a first light guide in a vehicle light according to an example of the present invention.
Figure 5:
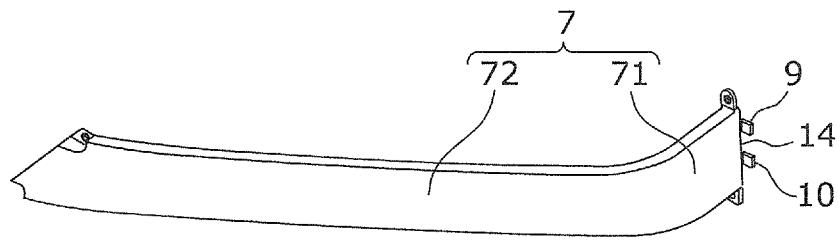
FIG. 5 is a perspective view of a second light guide in a vehicle light according to an example of the present invention.

Next, the vehicle light 3 according to an embodiment of the present invention will be described with reference to FIG. 2 though FIG. 5. FIG. 2 is an exploded perspective view of a vehicle light according to an embodiment of the present invention. FIG. 3 is a perspective view of relevant components of the vehicle light, showing a first light guide and a second light guide disposed inside a main case. FIG. 4 is a perspective view of the first light guide in the vehicle light. FIG. 5 is a perspective view of the second light guide in the vehicle light.

As is illustrated in FIG. 2 and FIG. 3, the vehicle light 3 includes a main case 5 having a front opening 4, a first light guide 6 and a second light guide 7 disposed in the main case 5, a light source (not shown in FIG. 2 or FIG. 3) that emits light into the first light guide 6 and the second light guide 7, a translucent cover 11 fitted to cover the opening 4 of the main case 5, and a frame 12 for attaching the cover 11 to the main case 5.

Moreover, the vehicle light 3 according to this embodiment includes, as the light source that emits light into the first light guide 6 and the second light guide 7, a light source 8 shown in FIG. 4 and light sources 9 and 10 shown in FIG. 5. The light source 8 is a first light source that emits light into the first light guide 6. The light sources 9 and 10 are second light sources that emit light into the second light guide 7.

As is illustrated in FIG. 1 through FIG. 4, the first light guide 6 is a rod-like component having a curve so as to be substantially U-shaped. The first light guide 6 is, for example, made of a translucent resin material such as polycarbonate or acrylic resin.

The first light guide 6 is rod-shaped and includes: a first extended section 61 (first rod-shaped extended section) that has a substantially slender cylindrical shape and extends from the inboard side of the first light guide relative to the widthwise direction of the vehicle toward the outboard side of the first light guide relative to the widthwise direction of the vehicle; and a second extended section 62 (second rod-shaped extended section) that has a substantially slender cylindrical shape, continues from the first extended section 61, curves back inward, and extends to the inboard side.

More specifically, the first light guide 6 is, for example, a cylindrical light guide that, when the main case 5 is installed in the vehicle 1, extends from the inboard side of the first light guide relative to the widthwise direction of the vehicle toward the outboard side of the first light guide relative to the widthwise direction of the vehicle, bends in a U shape, and then continues to extend from the outboard side of the first light guide relative to a widthwise direction of the vehicle toward the inboard side of the first light guide relative to the widthwise direction of the vehicle.

In this embodiment, the first extended section 61 and the second extended section 62 are arranged vertically so as to be substantially parallel to each other. Moreover, the outboard end portions of the first extended section 61 and the second extended section 62 in the widthwise direction of the vehicle 5 are connected together at a U-shaped portion 63 of the first light guide 6, which is the portion of the first light guide 6 that curves back.

The first light guide 6 includes, on the inboard side thereof in the widthwise direction of the vehicle, a light-incident portion 13 (first light-incident portion) on which light from the light source 8 is incident. In other words, the inboard side of the first light guide 6 in the widthwise direction of the vehicle is the light-incident portion 13. Moreover, the light source 8 is disposed across from the light-incident portion 13. It should be noted that the light-incident portion 13 is an unobstructed end of the first extended section 61, and the light source 8 is disposed across from the end surface of the first extended section 61.

It should be noted that an LED (light-emitting element) that emits, for example, white light, may be used as the light source 8. The light source 8 is configured as a LED module including, for example, a substrate, an LED chip, and a wavelength converting material (for example, phosphor). The light source 8 is fixed to a predetermined component such as the main case 5.

Conversely, as is illustrated in FIG. 1 through FIG. 4, the second light guide is plate-shaped and disposed so as to pass in front of or behind the U-shaped portion of the first light guide 6. The second light guide 7 is, for example, made of a translucent resin material such as polycarbonate or acrylic resin.

In this embodiment, the second light guide 7 is a plate-shaped component that extends from a position further outboard than the U-shaped portion 63 of the first light guide 6 (the most outboard portion of the first light guide 6 relative to the widthwise direction of the vehicle), passes in front of this portion of the first light guide 6, and extends to the inboard side relative to the widthwise direction of the vehicle.

More specifically, the second light guide 7 includes a plate-shaped first extended section 71 (first plate-shaped extended section) that extends from a rearward portion of the main case 5 toward the opening 4 (that is to say, forward), and a second extended section 72 (second plate-shaped extended section) that bends from the first extended section 71 and extends to the inboard side relative to the widthwise direction of the vehicle.

It should be noted that the boundary between the first extended section 71 and the second extended section 72, which is a bent portion, curves so as to have a curvature. Moreover, the outer surface of the first extended section 71 is disposed across from the inner surface of the main case 5, and the outer surface of the second extended section 72 is disposed across from the plane of the opening 4.

The first light guide 6 and the second light guide 7 cross each other in the U-shaped portion 63 of the first light guide 6 and in the bent portion of the second light guide 7. Moreover, in a front view of the vehicle light 3, the second extended section 72 of the second light guide 7 is disposed so as to be positioned between the first extended section 61 and the second extended section 62 of the first light guide 6.

The second light guide 7 includes, on an outboard side thereof in the widthwise direction of the vehicle, a light-incident portion 14 (second light-incident portion) on which light from the light sources 9 and 10 is incident. In other words, the outboard side of the second light guide 7 in the widthwise direction of the vehicle is the light-incident portion 14. Moreover, the light sources 9 and 10 are disposed across from the light-incident portion 14. It should be noted that the light-incident portion 14 is a free end of the first extended section 71, and the light sources 9 and 10 are disposed across from the end surface of the first extended section 71.

The light source 9 is a first light-emitting element that lights up to indicate the width of the vehicle, and the light source 10 is a second light-emitting element for a turn signal indicator that lights up to indicate a direction. It should be noted that a LED (light-emitting element) that emits, for example, white light, may be used as the light source 9. Moreover, it should be noted that a LED (light-emitting element) that emits, for example, amber light, may be used as the light source 10. The light sources 9 and 10 are configured as LED modules including, for example, a substrate, an LED chip, and a wavelength converting material (for example, phosphor). The light sources 9 and 10 are fixed to a predetermined component such as the main case 5.

Figure 6:
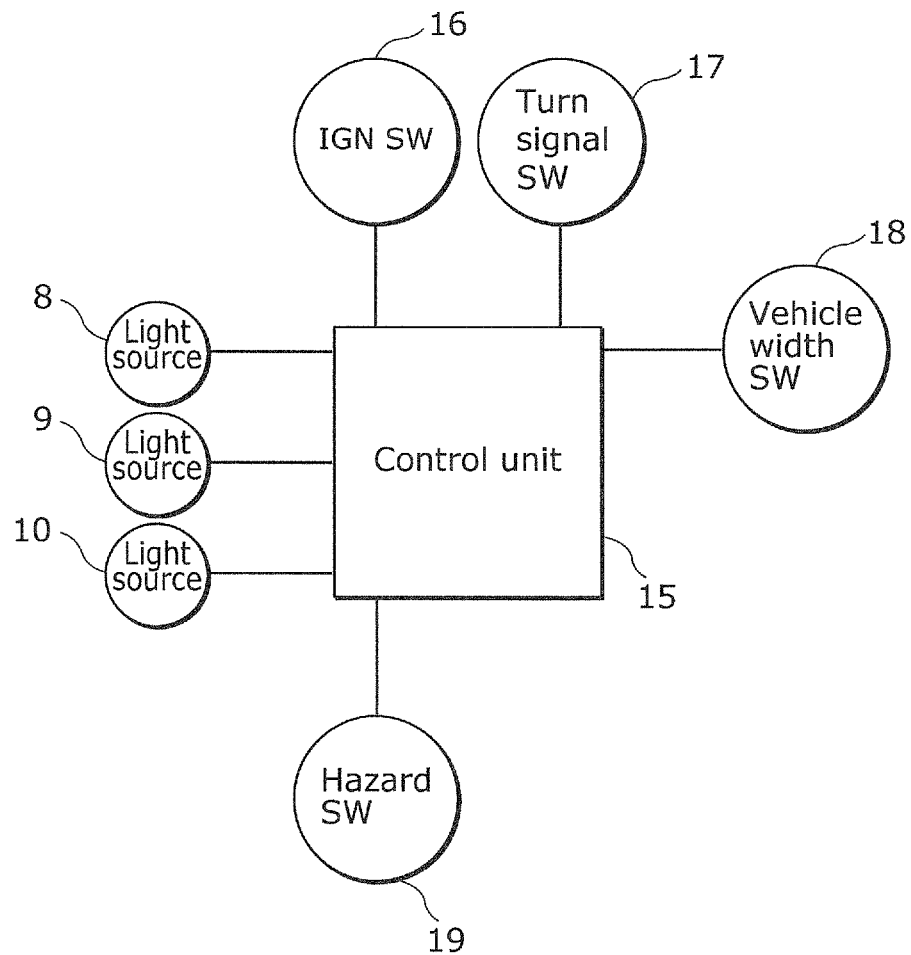
FIG. 6 is a block diagram illustrating control of a vehicle light according to an example of the present invention.

Moreover, as is illustrated in FIG. 6, the light sources 8, 9, and 10 are connected to a control unit 15. FIG. 6 is a block diagram illustrating control of the vehicle light according to an embodiment of the present invention.

The control unit 15 is connected to an ignition switch (IGN SW) 16, a turn signal switch (turn signal SW) 17, a vehicle width switch (vehicle width SW) 18, and a hazard switch (hazard SW) 19.

Figure 7:
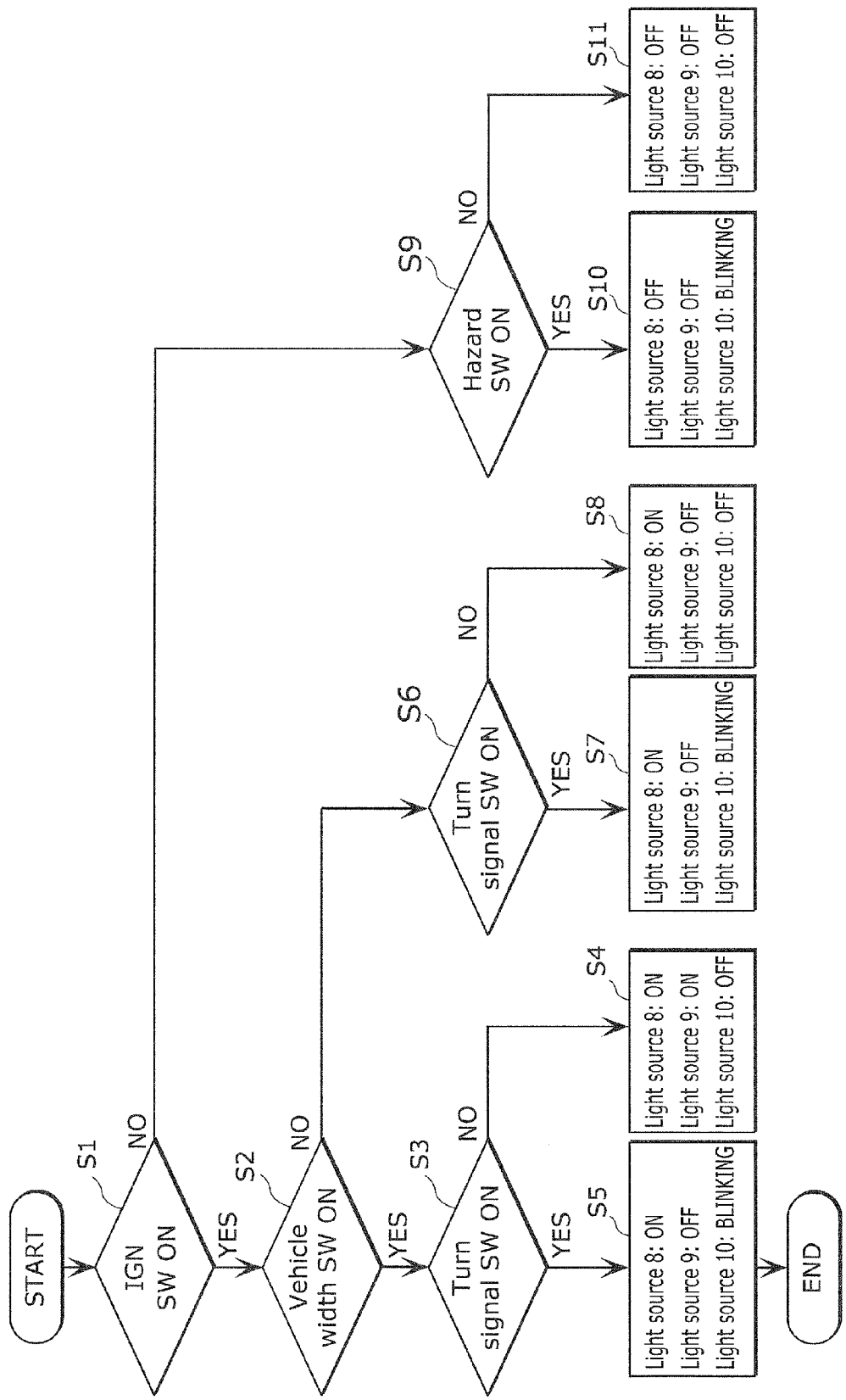
FIG. 7 is a flow chart illustrating operation of a vehicle light according to an example of the present invention.

Here, the operation of the vehicle light 3 will be explained with reference to FIG. 7. FIG. 7 is a flow chart illustrating operation of the vehicle light according to an embodiment of the present invention.

For example, when a user gets in the vehicle 1 and turns the ignition switch 16 ON (S1 in FIG. 7), the engine (not shown in the Drawings) starts. In this state, regardless of it being daytime or nighttime, the light source 8 turns on.

When the ignition switch 16 is ON (YES in S1 in FIG. 7) and further the vehicle width switch 18 is turned ON (YES in S2 in FIG. 7), illumination of the light source 9 is controlled by the control unit 15.

When the vehicle width switch 18 is ON, since the turn signal switch 17 is not used when the vehicle is moving directly forward (NO in S3 in FIG. 7), the control unit 15 turns the light source 9 ON (S4 in FIG. 7). In other words, when the vehicle width switch 18 is ON and the turn signal switch 17 is OFF (NO in S3 in FIG. 7), the light source 9 is ON. As such, in this case, the light sources 8 and 9 are ON, and the light source 10 is OFF.

When the light sources 8, 9, and 10 are in this particular combination of ON and OFF states, light from the light source 8 is incident on the light-incident portion 13 of the first light guide 6, resulting in illumination of the entire first light guide 6. In other words, the incident light from the light source 8 first passes through the first extended section 61 followed by the U-shaped portion 63, and then the second extended section 62, whereby light is emitted from the entire first light guide 6.

On the other hand, light from the light source 9 is incident on the light-incident portion 14 of the second light guide 7, resulting in illumination of the entire second light guide 7. In other words, the incident light from the light source 9 is first transmitted through the first extended section 71 and then the second extended section 72 so as to start from a position further outboard in the widthwise direction of the vehicle than the U-shaped portion 63 of the first light guide 6 and pass in front of the first light guide 6, resulting in illumination of the entire second light guide 7.

When both the light sources 8 and 9 are turned ON, since the first light guide 6 and the second light guide 7 cross each other at the U-shaped portion 63 of the first light guide 6, the light is brighter in this cross-over region than other regions of the first light guide 6 and second light guide 7. As a result, it is possible to improve the recognition rate of the width of the vehicle.

It should be noted that the shape of the region in which the light is brighter is the shape of the overlapping portion of the first light guide 6 and the second light guide 7. In this embodiment, the region in which the light is brighter is a vertical rectangle located at the outboard end in the widthwise direction of the vehicle on the as is illustrated in FIG. 1.

Moreover, when both the light sources 8 and 9 are ON in S3 in FIG. 7 and the turn signal switch 17 is activated so that the turn signal switch 17 is ON (YES in S3 in FIG. 7), the control unit 15 turns OFF the light source 9 and causes the light source 10 to blink (S5 in FIG. 7).

In other words, when the vehicle width switch 18 and the turn signal switch 17 are ON (YES in S3 in FIG. 7), the light source 8 is ON, the light source 9 is OFF, and the light source 10 is blinking. With this, the second light guide 7 functions as a turn signal indicator by repeatedly blinking amber light from the light source 10.

At this time, as a result of the second light guide 7 covering the front of the U-shaped portion 63 of the first light guide 6, the region of blinking amber light from the light source 10 is not blocked by the U-shaped portion 63 of the first light guide. As such, it is possible for the second light guide 7 to properly function as a turn signal indicator.

It should be noted that in this embodiment, in S2 in FIG. 7, even if the vehicle width switch 18 is OFF (NO in S2 in FIG. 7), when the turn signal switch 17 is ON (YES in S6 in FIG. 7), the control unit 15 turns OFF the light source 9 and causes the light source 10 to blink (S7 in FIG. 7). In other words, in this case, the light source 8 is ON, the light source 9 is OFF, and the light source 10 is blinking.

It goes without saying that when the vehicle width switch 18 is OFF, the light sources 9 and 10 are both OFF (S8 in FIG. 7) when the turn signal switch 17 is OFF (NO in S6 in FIG. 7). In other words, in this case, the light source 8 is ON and the light sources 9 and 10 are OFF.

Moreover, even if the ignition switch 16 is OFF (NO in S1 in FIG. 7), when the hazard switch 19 is ON (YES in S9 in FIG. 7), the control unit 15 turns OFF the light source 9 and causes the light source 10 to blink (S10 in FIG. 7). In other words, in this case, the light sources 8 and 9 are OFF and the light source 10 is blinking.

It goes without saying that in this case, if the hazard switch 19 is not used (NO in S9 in FIG. 7), the light sources 9 and 10 are both OFF (S11 in FIG. 7). In other words, in this case, the light sources 8, 9, and 10 are all OFF.

With the vehicle light 3 according to this embodiment, since the second light guide 7 is disposed so as to overlap the U-shaped portion 63 of the first light guide 6, a crossed portion is formed by the first light guide 6 and the second light guide 7 on the outboard side in the widthwise direction of the vehicle. When the light sources 8 and 9 are ON, this crossed portion is brighter than other portions of the first light guide 6 and the second light guide 7. As a result, it is possible to improve the recognition rate of the width of the vehicle. Consequently, the vehicle light 3 can be expected to be used as a light for a vehicle.

It should be noted that, as is described above, in order to effectively function as a turn signal indicator, the second light guide 7 may, for example, pass in front of the U-shaped portion 63 of the first light guide 6. However, the second light guide 7 may also pass behind the U-shaped portion 63 of the first light guide 6. In other words, the second light guide 7 may be disposed behind the first light guide first light guide so as to overlap the U-shaped portion 63 of the first light guide 6.

Moreover, in the above embodiment, the vehicle light 3 is exemplified as being installed on the front end of the vehicle 1, but the vehicle light 3 may be installed on the rear end of the vehicle 1.

Moreover, the light sources 8, 9, and 10 may be a surface mount device (SMD) type device in which one or a plurality of LED chips are mounted on a package substrate and this SMD is mounted on a substrate. The light sources 8, 9, and 10 may also be a chip on board (COB) type device in which one or a plurality of LED chips are directly mounted on a substrate.

It should be noted that when a COB type device is used, the LED chips of the light sources 9 and 10 may be mounted on the same substrate in order to achieve a more compact light source.

Moreover, in the above embodiment, LEDs (light emitting elements) that emit white light are used as the light sources 8 and 9, but the light sources 8 and 9 may be light sources that emit white light by using, for example, an LED chips that emits blue or ultraviolet light and a wavelength converting material such as a phosphor, or a light source that emits white light by having an LED chip that emits blue light, an LED chip that emits red light, and an LED chip that emits green light.

Figure 8:
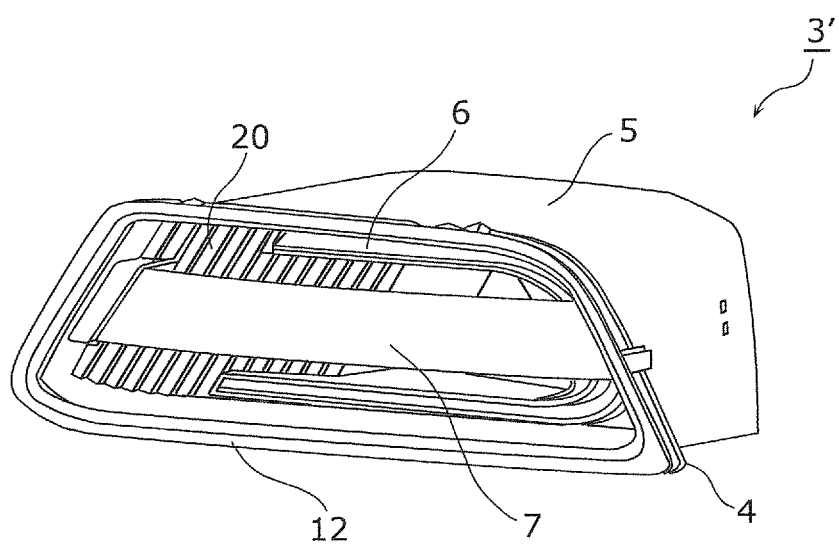
FIG. 8 is a perspective view of a vehicle light according to an example of the present invention.

Moreover, as is the case with a vehicle light 3' according to a modified embodiment illustrated in FIG. 8 through FIG. 10, a reflector 20 may be provided behind the first light guide 6 and the second light guide 7.

FIG. 8 is a perspective view of the vehicle light according to a modified embodiment of the present invention. FIG. 9 shows the structure of the vehicle light according to a modified embodiment of the present invention. In FIG. 9, (a) is a front view, (b) is a left side view, (c) is a right side view, (d) is a top view, (e) is a bottom view, and (f) is a rear view. FIG. 10 is a cross sectional view at the line A-A shown in (a) in FIG. 9.

In this case, it is possible to use the light from the first light guide 6 and the second light guide 7 that is emitted in directions other than forward by reflecting it forward with the reflector 20. The reflector 20 is, for example, a resin reflector plate having a metal evaporation coating on the surface of the resin. It should be noted that the reflector 20 may be made of metal. It should be noted that in FIG. 8 and FIG. 9, the portions behind the cover 11 that are visible are drawn in solid lines.

Furthermore, the reflector 20 may have ridges and grooves. By providing the reflector 20 with ridges and grooves, the embellishment of the vehicle light 3' can be increased.

Moreover, the first light guide 6, the second light guide 7, and the reflector 20 may be provided such that the end portions of the first light guide 6 and the second light guide 7 are behind the reflector 20. With this, the end portion of the first light guide 6 (the light-incident portion 13) and the end portion of the second light guide 7 (the light-incident portion 14) across from which the light sources 8, 9, and 10 are disposed can be hidden by the reflector 20.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A vehicle light installed in a vehicle, the vehicle light comprising:
    a main case having a front opening;
    a first light guide and a second light guide that are disposed in the main case;
    a light source that emits light into the first light guide and the second light guide; and
    a translucent cover fitted to cover the opening of the main case,
    wherein the first light guide is rod-shaped and includes a first extended section extending from an inboard side of the first light guide relative to a widthwise direction of the vehicle toward an outboard side of the first light guide relative to the widthwise direction of the vehicle and a second extended section that continues from the first extended section, curves back inwardly, and extends to the inboard side, and
    the second light guide is plate-shaped and disposed so as to pass one of in front of and behind a portion of the first light guide that curves back.

2. The vehicle light according to claim 1,
    wherein the light source includes a first light source that emits light into the first light guide and a second light source that emits light into the second light guide.

3. The vehicle light according to claim 1,
    wherein the first light guide includes, on the inboard side, a first light-incident portion on which light from the light source is incident.

4. The vehicle light according to claim 1,
    wherein the second light guide includes, on an outboard side relative to the widthwise direction of the vehicle, a second light-incident portion on which light from the light source is incident.

5. The vehicle light according to claim 2,
    wherein the second light source includes a first light-emitting element used to indicate a width of the vehicle and a second light-emitting element used for a turn signal indicator.

6. A vehicle comprising
    the vehicle light according to claim 1,
    wherein the vehicle light is disposed to a left and right of a longitudinal center line of the vehicle.

\* \* \* \* \*